Nov. 27, 1951  P. C. JURS  2,576,517
PRESSURE RELIEF VALVE
Filed May 19, 1947
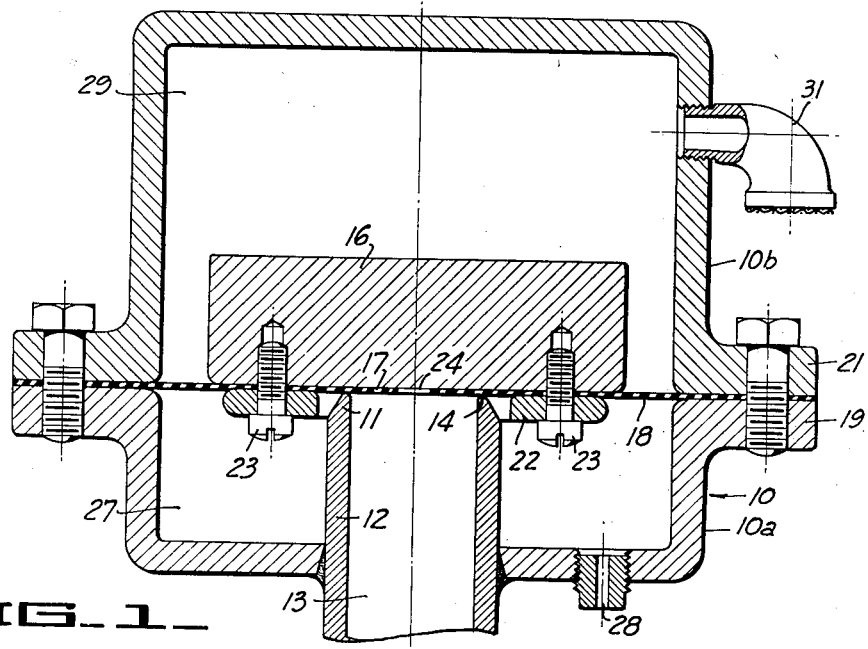
FIG_1_
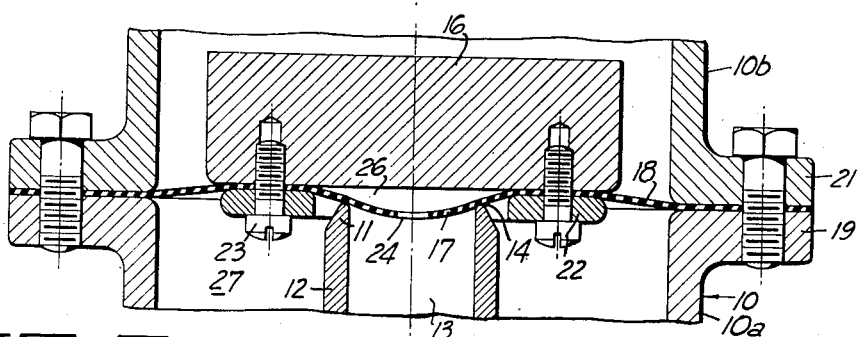
FIG_2_
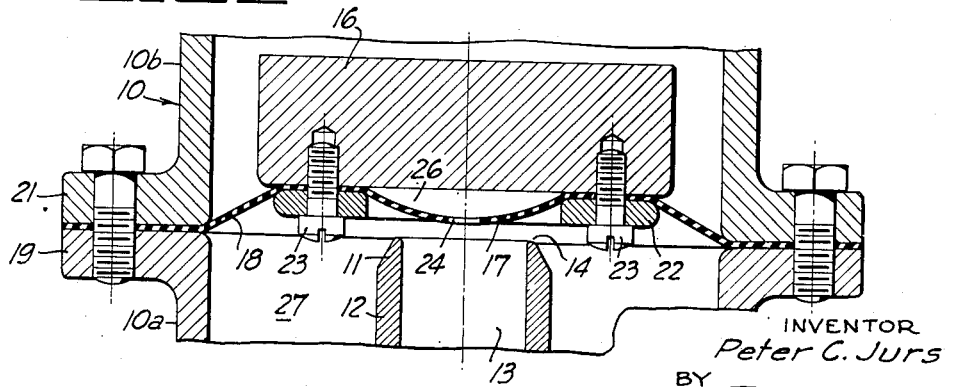
FIG_3_
INVENTOR
Peter C. Jurs
BY
ATTORNEY Patented Nov. 27, 1951

2,576,517

UNITED STATES PATENT OFFICE 2,576,517

PRESSURE RELIEF VALVE

Peter C. Jurs, Oakland, Calif., assignor to Shand and Jurs Company, Berkeley, Calif., a partnership Application May 19, 1947, Serial No. 748,982

6 Claims. (Cl. 137—53)

1

This invention relates generally to valves of the type adapted to vent gas from a pressure system when the gas pressure reaches a predetermined value for which the device is set to open.

In the past so-called pressure relief valves of conventional design have been subject to certain inherent disadvantages. In general such devices have used hinged or swinging flaps, guided valve discs or pallets, or valve balls, which are urged by spring or other loading means toward closed position with respect to a stationary valve seat. The valve working surfaces may be metal, or one or both of the valve surfaces may be faced with non-metallic material such as leather, rubber or various compositions.

An ideal relief valve should remain "dead tight" until the pressure reaches the value for which it is set to open. Assuming that a "blow down" is desired, the valve should then open to the limit of its opening movement, and remain open until the pressure system being protected is vented down to a predetermined lower closing pressure. The valve member should then again close upon its seat without such severe pounding as to cause injury to the valve surfaces. After closing it should again be sealed with respect to leakage.

Pressure relief valves of the conventional design, when in actual service, do not provide the "dead tight" seal desired, and they frequently tend to be erratic with respect to the pressure required to open the same. Furthermore small particles of dirt or small amounts of corrosion upon one of the valve working surfaces will tend to prevent a proper seal, particularly where foreign solids may be carried by the gas or liquid in the system.

It is an object of the present invention to provide a relief valve which will overcome the disadvantages of conventional relief valves as outlined above, and which in general will afford a "dead tight" seal over long periods of operating service, with a reliable opening at the desired set pressure.

Another object of the invention is to provide a relief valve which can be operated over long periods of time and under adverse conditions, without serious injury or deterioration of the valve surfaces.

Additional objects of the invention will appear from the following description in which the preferred embodiment has been set forth in detail in conjunction with the accompanying drawings.

Referring to the drawings:

Figure 1 is a side elevational view in section,

2 illustrating a relief valve incorporating the present invention.

Figure 2 is a view showing a portion of the relief valve of Figure 1, but with the parts in a different operating position.

Figure 3 is a sectional view like Figure 2 showing the full open position of the valve.

The device as illustrated in the drawings consists generally of a body 10 formed of the separable parts 10a and 10b. Within the body there is a horizontally disposed annular valve seat 11 which is formed upon the upper end of a pipe or conduit 12. For convenience the pipe extends directly down through the lower wall of body part 10a to form the inlet passage 13. The upper seating or sealing surface of the seat 11 is preferably rounded as illustrated at 14.

Extending over the seat 11 there is a rigid member 16 which in this instance is of considerable weight in order to provide the desired loading force for the device. Interposed between the lower surface of member 16 and the valve seat 11 there is a flexible member 17 formed of suitable material such as fabric reinforced synthetic rubber. Also extending between member 16 and the body there is a flexible diaphragm 18. For simplicity the flexible member 17 and diaphragm 18 are formed integral, that is from one sheet of suitable flexible material.

The outer peripheral margin of diaphragm 18 is shown clamped between the flanges 19 and 21 provided on the body parts 10a and 10b. A clamping ring 22 is secured to the lower face of member 16 as by means of screws 23. This clamping ring serves to clamp and form a sealed engagement between the flexible member 17 and member 16, in a region surrounding and spaced outwardly from the annular valve seat 11. An opening 24 is also provided centrally of member 17 whereby the space 26 (Figures 2 and 3) between members 16 and 17 is in communication with the inlet 13.

The body part 10a provides a closed chamber 27 surrounding the valve seat and below the diaphragm 18. A flow restricting orifice 28 serves to vent this space to the atmosphere. The space 29 above the diaphragm 18 is shown freely vented to the atmosphere through the screened pipe fitting 31.

Operation of the pressure relief valve described above can be described as follows: The valve is installed whereby the seat 11 is in a horizontal position, and with inlet 13 connected to the pressure being protected. The weight of the rigid member 16, together with the effected area of the orifice through seat 11, determines the pressure for which the device will open. This pressure can be adjusted in practise by changing the weight of member 16. When the pressure applied to inlet 13 is at or near atmospheric the parts occupy the position shown in Figure 1, with the weight of member 16 being applied directly through flexible member 17 to the valve seat. However when the pressure applied to inlet 13 is of the order of the normal range of pressures prevailing in the pressure system, the upward force of the pressure upon member 16 causes this member to rise with respect to the seat to a position such as shown in Figure 2. In this working position it will be noted that member 16 is actually carried by a pneumatic cushion, and that the flexible member 17 is flexed downwardly against the rounded surface 14, to provide a good gas tight seal. This floating action is by virtue of the fact that space 26 connects with the inlet through the opening 24, whereby the inlet pressure acts upon the upper side of the flexible member 17. For the free floating position illustrated in Figure 2 it will be evident that the flexible member 17 will conform to the contouring of the seat, and any warpage of the seat, local surface irregularity, or even the presence of small solid particles, will not interfere with a gas tight seal. In the event the inlet pressure reaches the maximum value for which the device is set to open, member 16 together with the flexible member 17 can move upwardly free of the seat as shown in Figure 3. Immediately upon cracking the seal between the seat and flexible member 17, a flow of the gas into the chamber 27 starts to build up a pressure in this chamber due to the fact that venting of this chamber to the atmosphere through orifice 28 is restricted. This pressure acts upwardly upon the diaphragm 18, thus aiding in securing rapid and positive movement to full open position.

Once the valve has been opened by an excessive pressure, the pressure of the system must be reduced to a closing value substantially below the opening pressure, before the flexible member 17 together with member 16 again drop down to closed position. The amount of this "blow down" is dependent upon a number of factors including particularly the effective area of the diaphragm 18 and the size of the orifice 28. A smaller orifice 28, or a larger effective area for the diaphragm 18, will provide a greater "blow down."

While in the open position illustrated in Figure 3, the flexible member 17 retains its ballooned form as illustrated, and in closing there is a pneumatic cushioning of the closing impact to avoid serious injury to the sealing surfaces. The continued ballooning of flexible member 17 just described occurs due to the jetting action of gas from the orifice of the seat, which impinges directly upon the opening 24, thus causing a substantial static pressure in space 26.

In actual tests the relief valve described above shows remarkable ability in retaining a "dead tight" seal for normal working pressures for which the device is adapted, and extending up to the pressure for which the device is set to open. In other words my relief valve overcomes the common defect of conventional relief valves in that the latter tend to leak at an increasing rate as the pressure rises to the set pressure for which the device opens, whereas with my valve leakage remains negligible virtually up to the set pressure.

As an example of typical operation of my relief valve, the weight of the rigid member 16, in conjunction with the size of the seat 11, is such that it is set to open at 3 p. s. i. Over a range of operating pressure down to as low as 1.5 p. s. i., the member 16 floats pneumatically and the flexible member 17 seats itself under pneumatic pressure upon the seat surface 14. Throughout this entire pressure range leakage is negligible. At about 3 p. s. i. the valve moves to full open position, and does not close until the pressure has been vented down to a value of 2 p. s. i. Then the valve closes automatically, with reestablishment of a perfect seal between the flexible member 17 and the valve seat.

I claim:

1. In a pressure relief valve, an annular valve seat, a rigid member overlying and extending across the valve seat, a flexible sealing member interposed between the seat and the rigid member, means serving to clamp and seal said flexible member to the rigid member along an annular region spaced outwardly from the seat, the flexible member having a portion free for flexing movements relative to the rigid member and extending from said region across the valve seat, the flexible and rigid members serving to define a space between the same which extends inwardly from said annular region over the valve seat, said space being in communication with the inlet side of said seat, a body serving to mount the seat and providing an inlet passage communicating with the seat, and a flexible diaphragm operably connected to said rigid member and having an outer peripheral margin of the same sealed with respect to the body, said diaphragm extending generally in a plane parallel to the plane of the seat.

2. In a pressure relief valve, an annular valve seat, a rigid member overlying and extending across the valve seat, a flexible sealing member interposed between the seat and the rigid member, means serving to clamp and seal said flexible member to the rigid member along an annular region spaced outwardly from the seat, the flexible member having a portion free for flexing movements relative to the rigid member and extending from said region across the valve seat, the sealing and rigid members serving to define a space between the same which extends inwardly from said annular region over the valve seat, said space being in communication with the inlet side of said seat, a body serving to mount the seat and providing an inlet passage communicating with the seat, a flexible diaphragm operably connected to said rigid member and having an outer peripheral margin of the same sealed with respect to the body, said diaphragm extending generally in a plane parallel to the plane of the seat, the body providing a closed chamber below the diaphragm and surrounding the seat, and a flow restricting vent orifice for said chamber.

3. In a pressure relief valve, a body serving to mount an annular valve seat and providing an inlet passage communicating with said seat, a rigid member overlying and extending across the valve seat, and a flexible sealing member interposed between the seat and the rigid member and having an outer peripheral margin sealed with respect to the body and an annular portion sealed to said rigid member in a region disposed outwardly from said seat, the flexible member having a portion free for flexing movements relative to the rigid member and extending from said region across the valve seat, the rigid and flexible members serving to define a space extending from the annular portion over the seat and being in communication with the inlet passage.

4. In a pressure relief valve, an annular valve seat, a rigid member overlying the valve seat, a flexible sealing member interposed between the seat and the rigid member, means serving to clamp and seal said flexible member to the rigid member along an annular region spaced outwardly from the seat, the flexible member having a portion free for flexing movements relative to the rigid member and extending from said region across the valve seat, said flexible and rigid members serving to define a space therebetween and which extends inwardly from said annular region over the valve seat, said space being in communication with the orifice through said seat, said rigid member affording a substantial amount of weight for providing a loading force, a flexible diaphragm having an inner portion attached and sealed with respect to said rigid member and also having an outer peripheral margin of the same clamped and sealed with respect to the body, said diaphragm extending generally in a plane parallel to the plane of the seat, the body providing a closed chamber below the diaphragm and surrounding the seat, and a flow restricting vent orifice for said chamber.

5. In a pressure relief valve, an annular valve seat, a rigid member overlying the valve seat, a flexible sealing member interposed between the seat and the rigid member, means serving to clamp and seal said flexible member to the rigid member along an annular region spaced outwardly from the seat, the flexible member having a portion free for flexing movements relative to the rigid member and extending from said region across the valve seat, said rigid and flexible members serving to define a space therebetween which extends inwardly from said annular region across said seat, said flexible sealing member being provided with an opening through the central portion of the same serving to establish communication between said space and the orifice through said seat, a body serving to mount the seat and providing an inlet passage communicating with the seat, a flexible diaphragm having an inner portion attached to said rigid member and having an outer peripheral margin clamped and sealed with respect to the body, said diaphragm extending generally in a plane parallel to the plane of the seat, the body providing a closed chamber below the diaphragm and surrounding the seat, and a flow restricting vent orifice for said chamber.

6. In a pressure relief valve, an annular valve seat, a rigid member overlying the valve seat and affording a substantial amount of loading weight, a flexible sealing member interposed between the seat and the rigid member, means serving to clamp and to seal said flexible sealing member to the rigid member along an annular region spaced outwardly from the seat, the flexible member having a portion free for flexing movements relative to the rigid member and extending from said region across the valve seat, said rigid and flexible members serving to define a space therebetween which extends inwardly from said annular region across said seat, a body serving to mount the seat and provide an inlet passage communicating with the seat orifice, a flexible diaphragm formed as an extension of said flexible member, said diaphragm having an outer peripheral margin of the same clamped and sealed with respect to the body, an opening in said flexible member serving to establish communication between said space and the valve orifice, the body providing a closed chamber below the diaphragm and surrounding the seat, and a flow restricting vent orifice for said chamber.

PETER C. JURS.

REFERENCES CITED

The following references are of record in the file of this patent:

UNITED STATES PATENTS

| Number | Name | Date |
|---|---|---|
| 313,080 | Kaiser | Mar. 3, 1885 |
| 1,988,026 | Unger | Jan. 15, 1935 |
| 2,213,181 | Wangenheim | Aug. 27, 1940 |
| 2,277,656 | Falls | Mar. 24, 1942 |
| 2,317,923 | Lebo | Apr. 27, 1943 |
| 2,479,737 | Garretson | Aug. 23, 1949 |